UNITED STATES PATENT OFFICE.

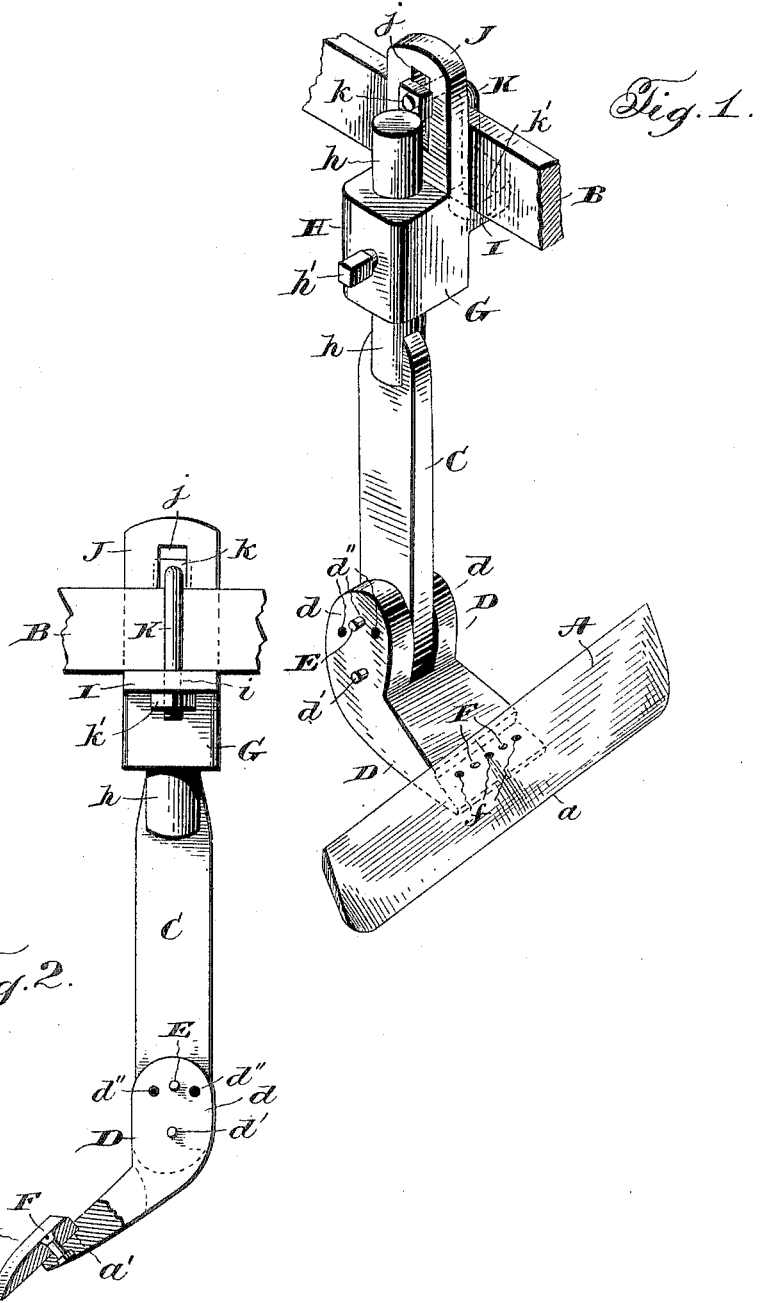

CHARLES D. EDDY, OF BLUE CREEK TOWNSHIP, PAULDING COUNTY, OHIO.

WEEDER ATTACHMENT.

No. 816,851.     Specification of Letters Patent.     Patented April 3, 1906.

Application filed August 5, 1905. Serial No. 272,834.

*To all whom it may concern:*

Be it known that I, CHARLES D. EDDY, a citizen of the United States, residing in Blue Creek township, in the county of Paulding and State of Ohio, have invented certain new and useful Improvements in Weeder Attachments, of which the following is a specification, reference being had therein to the accompanying drawings.

This invention relates to improvements in weeder attachments adapted for use in connection with various types of farming machinery, as will be obvious, but designed more particularly for use in connection with plows.

A convenient embodiment of the invention embraces a transversely-disposed cutter-blade designed to be situated preferably in front of a plow and arranged transversely to the line of travel thereof, a shank to which said blade is adjustably secured, and means for adjustably mounting the shank upon the plow-beam or the like, said last-mentioned means more specifically comprising a bracket adapted to be clamped to a plow-beam or its equivalent, said bracket having a bearing into which the upper end of the knife-carrying shank extends and is adjustable both vertically and rotatably.

The above-mentioned embodiment of the invention is illustrated in the accompanying drawings, in which—

Figure 1 is a perspective view of the attachment; and Fig. 2 is a front elevation, parts being shown in section.

Referring more specifically to the drawings, wherein like reference characters refer to corresponding parts in both views. A designates a cutter-blade, which is of an elongated type having a forwardly-disposed cutting edge $a$, said blade being adapted to be mounted on a machine so that the same will occupy a position transverse to the line of travel of the machine to which it is attached, it being sufficient to illustrate herein simply a longitudinal beam—for instance, a plow-beam B, to which the attachment is secured in the latter case in advance of the plow.

C is a vertically-disposed shank, to which the blade A is secured through the medium of a pivoted member D, having ears $d$, between which the lower end of the shank is pivoted, as at $d'$. This pivoted member also has a series of concentrically-arranged alined apertures $d''$, any pair of which is arranged to be brought into registration with a corresponding aperture $d^2$ in the shank for the reception of a locking-pin E.

The forward end of the pivoted member D is flat and formed with a seat $a'$ for the reception of the inner edge of the cutter-blade, this seat being somewhat inclined, Fig. 2, whereby the blade will give a shearing cut. The means for securing the blade to its seat include a pair of bolts or pins F, carried by the pivoted member, arranged to engage any pair of a series of apertures $f$ in the cutter-blade. By this means the blade may be adjusted so as to project the desired distance to either side of the member D, and the means for pivotally adjusting said member relative to the shank permits the vertical angular adjustment of the blade relative to the ground.

G represents a supporting-bracket for adjustably mounting the shank C upon the beam B, said bracket having an offset bearing H, into which a substantially circular upper extension $h$ of the shank projects, and is rotatably adjustable, as also vertically adjustable, through the medium of a binding-screw $h'$. On the bracket and offset in a direction opposite to the bearing H is a flange or ledge I, upon which the bottom edge of the beam B rests, the flat inner side of said beam abutting a vertical extension J of the bracket. This vertical extension is provided with a relatively long slot $j$, through which the shorter end of an inverted-L-shaped bolt K passes and is clamped in position by a nut $k$, the protruding portion of this shorter end of the bolt overlying the top edge of the beam B, while the longer end thereof extends downwardly along the outer face of the beam and through an aperture $i$ in the ledge I, whence it is clamped in position beneath said ledge by a binding-nut $k'$. The arrangement just described affords a highly-efficient clamp for rigidly securing the bracket, and incidentally the cutting implement, to a beam, it being noted that a binding action both sidewise and vertically of the beam is obtained through a very simple device.

Having thus described the invention, what is claimed as new, and desired to be secured by Letters Patent, is—

1. An attachment of the character described comprising a transversely-adjustable cutter-blade, and means for supporting the same including a shank, means for rotatably and lengthwise adjustably supporting the shank, and a shiftable member between the shank and blade whereby the angularity of the blade relative to the ground may be changed.

2. An attachment of the character described comprising a transversely-disposed blade, and means for supporting the same including a shank, means for rotatably and lengthwise adjustably supporting the shank, and a shiftable member between the shank and blade whereby the vertical angularity of the blade relative to the ground may be changed.

3. An attachment of the character described comprising a bracket having vertical and lateral bearing-surfaces for engaging the bottom and side surfaces of a beam, a substantially L-shaped bolt adjustably associated with said bracket and arranged to bear against the top and opposite side surfaces of said beam, an offset portion on said bracket, a shank member and an implement associated therewith in combination with means for adjustably securing said shank member in said offset portion of the before-mentioned bracket.

4. An attachment of the character described comprising a bracket having vertical and lateral bearing-surfaces for engaging the bottom and side surfaces of a beam, a substantially L-shaped bolt adjustably associated with said bracket and arranged to bear against the top and opposite side surfaces of said beam, an offset portion on said bracket, provided with a vertical opening, a shank member and an implement associated therewith in combination with means for adjustably securing said shank member in the opening of said offset portion.

In testimony whereof I affix my signature in presence of two witnesses.

CHARLES D. EDDY.

Witnesses:
  E. M. LESLIE,
  A. C. DECKER.